US005959823A

United States Patent [19]

Shirakawa et al.

[11] Patent Number: 5,959,823

[45] Date of Patent: Sep. 28, 1999

[54] TANK-TYPE SURGE ARRESTER

[75] Inventors: Shingo Shirakawa; Satoshi Watahiki, both of Hitachi, Japan

[73] Assignee: Hitachi, Ltd., Tokyo, Japan

[21] Appl. No.: 09/084,910

[22] Filed: May 28, 1998

[30] Foreign Application Priority Data

May 30, 1997 [JP] Japan .................................... 9-141384

[51] Int. Cl.[6] ........................................................ H02H 3/00

[52] U.S. Cl. .............................. 361/117; 361/56; 361/127

[58] Field of Search ................................ 361/56, 91, 111, 361/117, 118, 126, 127

[56] References Cited

U.S. PATENT DOCUMENTS

| | | | |
|---|---|---|---|
| 4,321,651 | 3/1982 | Ozawa et al. | 361/127 |
| 5,539,607 | 7/1996 | Komatsu et al. | 361/126 |

FOREIGN PATENT DOCUMENTS

| | | | |
|---|---|---|---|
| 634757 | 12/1996 | European Pat. Off. | H01C 7/12 |
| 55-105989 | 8/1980 | Japan | H01T 1/00 |

OTHER PUBLICATIONS

Application of High Withstanding Zinc Oxide Elements to SF6 Gas Insulated Tank Type Surge Arresters for the 22kV–765kV Power System, S. Shirakawa et al, 6 pages.

*Primary Examiner*—Jeffrey Gaffin
*Assistant Examiner*—Stephen Jackson
*Attorney, Agent, or Firm*—Fay, Sharpe, Beall, Fagan, Minnich & McKee

[57] ABSTRACT

A tank-type surge arrester includes a zinc oxide element unit having zinc oxide elements, a top shield ring for earth insulation control disposed on top of the zinc oxide element unit, an upper shield ring disposed below the top shield ring in an upper section of the zinc oxide element unit, an expanded lower shield ring disposed below the upper shield ring in the upper section of the zinc oxide element unit, and tubular conductors disposed between the upper and the lower shield rings so as to be included in a vertical plane on an extension of a high-tension conductor.

7 Claims, 8 Drawing Sheets

TANK-TYPE SURGE ARRESTER

BACKGROUND OF THE INVENTION

The present invention relates to a surge arrester for use in a substation and, more particularly, to a tank-type surge arrester connected to a gas-insulated switchgear or a power transformer.

Standards specified for gas-insulated tank-type surge arresters in Surge Arrester Standards JBC-2372-1995 are applied to high-performance surge arresters of voltage capacities in the range of 187 kV to 500 kV. Such a surge arrester employs zinc oxide elements having a reference voltage on the order of 200 V/mm as basic elements. Zinc oxide elements are connected simply in series to construct a surge arrester. Such a surge arrester is too long to use the same as a tank-type surge arrester for a gas-insulated switchgear. Therefore, the zinc oxide elements are arranged on four poles and are connected in a zigzag arrangement to form the surge arrester in a shorter length so that the surge arrester can be constructed in a reduced height.

A zinc oxide element having a reference voltage of, for example, 400 V/mm can be formed by increasing the resistance of the zinc oxide element by forming the same of zinc oxide grains of smaller grain sizes to increase the number of zinc oxide grains connected in series. Thus, the working voltage of the zinc oxide element can be increased and thereby the length of the zinc oxide element can be reduced by about half. If the length of the zinc oxide element can be thus reduced, a tank-type surge arrester for a gas-insulated switchgear can be constructed by stacking zinc oxide elements linearly instead of arranging the zinc oxide elements in three or four columns and connecting the same in a zigzag connection. For example, a tank-type surge arrester having a voltage capacity in the range of 154 to 500 kV and comprising zinc oxide elements linearly connected in series can be realized. Thus, a gas-insulated tank-type surge arrester can be miniaturized by using a reduced number of zinc oxide elements each having an increased resistance.

However, a high-voltage withstanding zinc oxide element having a high withstand voltage and a high resistance is formed of zinc oxide grains of small grain sizes and hence the capacitance of such a zinc oxide element is smaller than that of the conventional zinc oxide element. A tank-type surge arrester employing zinc oxide elements having a small capacitance is susceptible to the influence of stray capacitance capacity relative to a grounding tank and voltage is irregularly distributed to the elements. Consequently, in a high-performance surge arrester for use at a high voltage applied ratio, the voltage applied life characteristic of the elements is deteriorated due to irregular voltage distribution and the surge arrester become practically unusable.

A method of controlling voltage distribution to the conventional zinc oxide elements disclosed in Japanese Patent Laid-Open No. 55-105989 or European Patent Publication No. EP0634757B1 discretely arranges coaxial metal shield rings including a head shield ring and a tail shield ring of the same diameter from a high-voltage side.

A tank-type surge arrester shown in FIG. 10 employs the method mentioned in Japanese Patent Laid-Open No. 55-105989 or European Patent Publication No. EP0634757B1. In this tank-type surge arrester, voltage distribution indicated by a dotted line in FIG. 9 is about 1.18 and voltage applied ratio is on the order of 100%. Therefore, this tank-type surge arrester is not suitable for use at a high voltage applied ratio. Usually, voltage applied ratio for a tank-type surge arrester is set at 90% or below to ensure that the zinc oxide elements have a satisfactory voltage applied life characteristic. However, actual voltage applied ratio often exceeds the set value. Therefore, it is necessary to limit voltage distribution to 1.1 or below and voltage applied ratio to 90% or below. Thus the prior art is unable to provide a tank-type surge arrester employing high-resistance zinc oxide elements and capable of limiting voltage distribution to 1.1 or below.

SUMMARY OF THE INVENTION

Accordingly, it is a first object of the present invention to provide a tank-type surge arrester capable of properly controlling voltage distribution.

A second object of the present invention is to provide a tank-type surge arrester comprising zinc oxide elements having a high resistance and capable of properly controlling voltage distribution even if the intrinsic capacitance of the zinc oxide elements is reduced.

A third object of the present invention is to provide a tank-type surge arrester employing high-resistance zinc oxide elements in which voltage distribution is 1.1 or below even if the intrinsic capacitance of the zinc oxide elements is reduced.

According to one aspect of the present invention, a tank-type surge arrester comprises a zinc oxide element unit including zinc oxide elements, a top shield ring for earth insulation control disposed on top of the zinc oxide element unit, an upper shield ring disposed below the top shield ring in an upper section of the zinc oxide element unit, an expanded lower shield ring disposed below the upper shield ring in the upper section of the zinc oxide element unit, and tubular conductors disposed between the upper and the lower shield ring so as to be included in a vertical plane on an extension of a high-tension bus.

The tubular conductor is connected to the lower shield ring by a connector. The reference voltage of the zinc oxide elements is 200 V/mm or above.

BRIEF DESCRIPTION OF THE DRAWINGS

The above and other objects, features and advantages of the present invention will become more apparent from the following description taken in connection with the accompanying drawings in which.

DESCRIPTION OF THE PREFERRED EMBODIMENTS

First Embodiment

Figure 1:
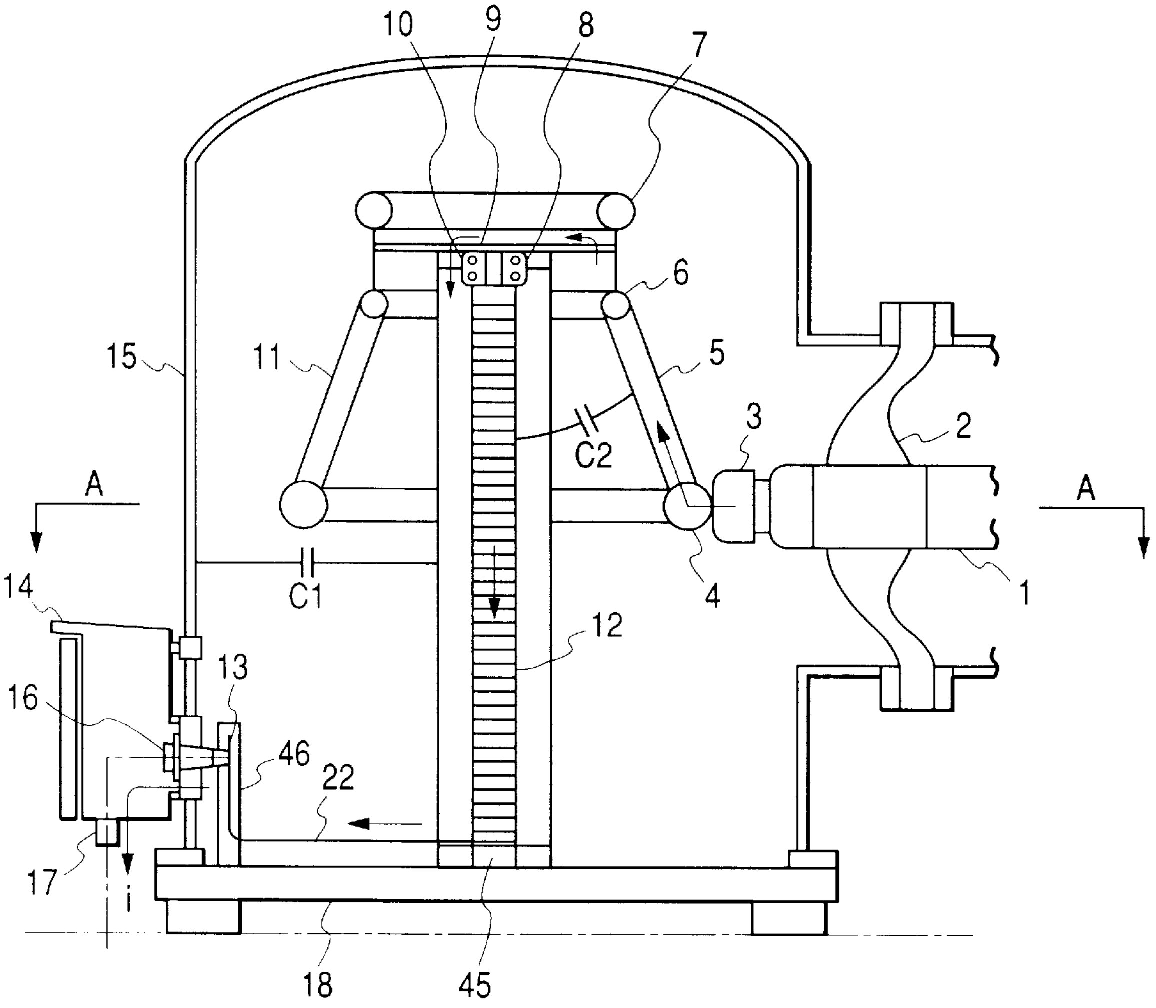
FIG. 1 is a longitudinal sectional view of a tank-type surge arrester in a first embodiment according to the present invention.
Figure 2:
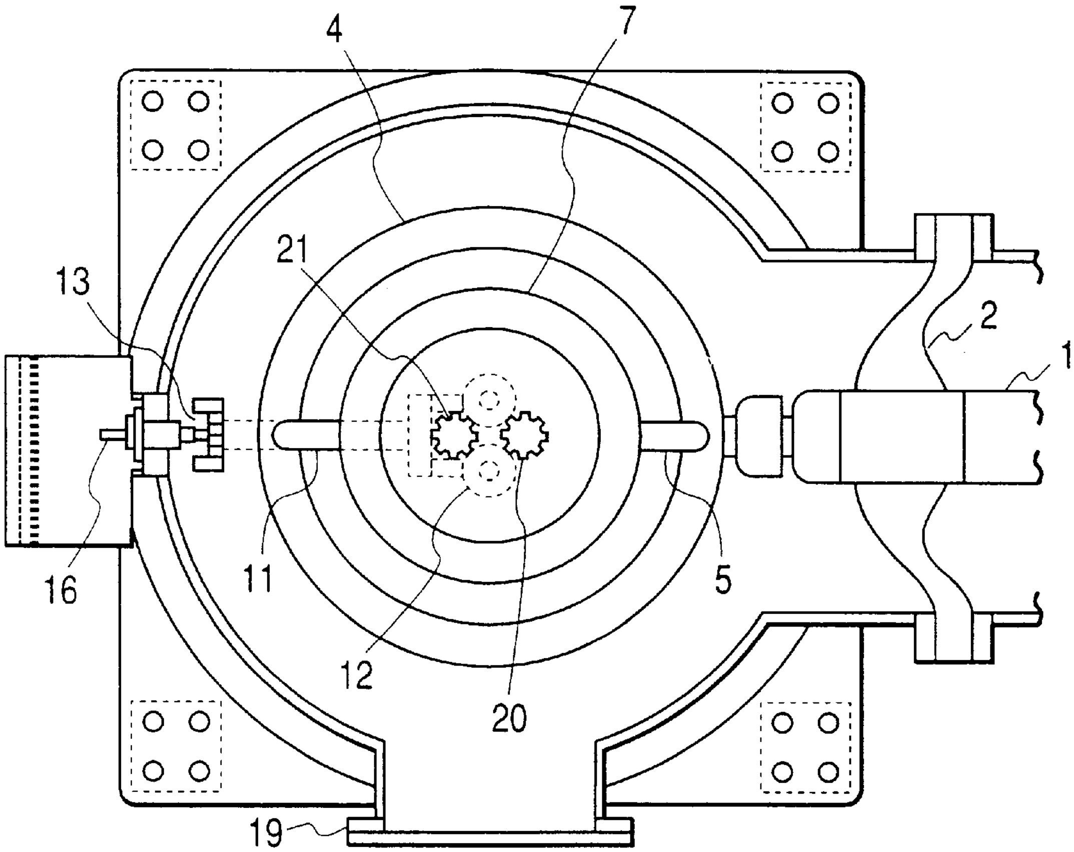
FIG. 2 is a sectional view taken on line A—A in FIG. 1.
Figure 3:
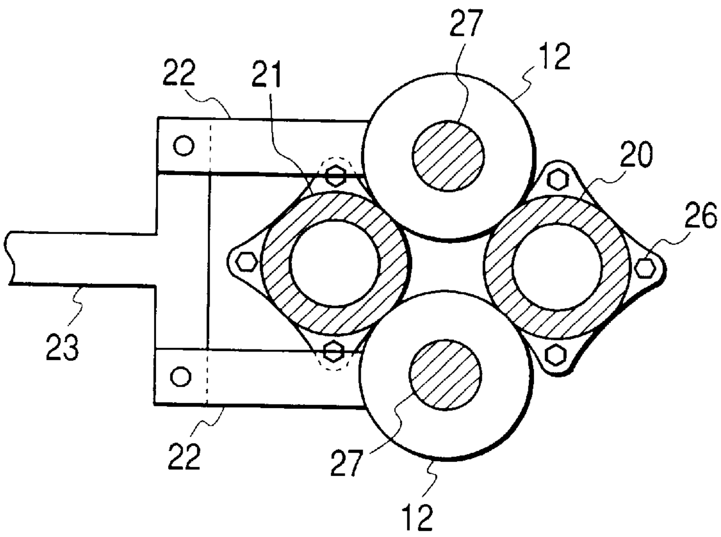
FIG. 3 is an enlarged cross-sectional view of a zinc oxide element unit included in the tank-type surge arrester of FIG. 1.
Figure 4:
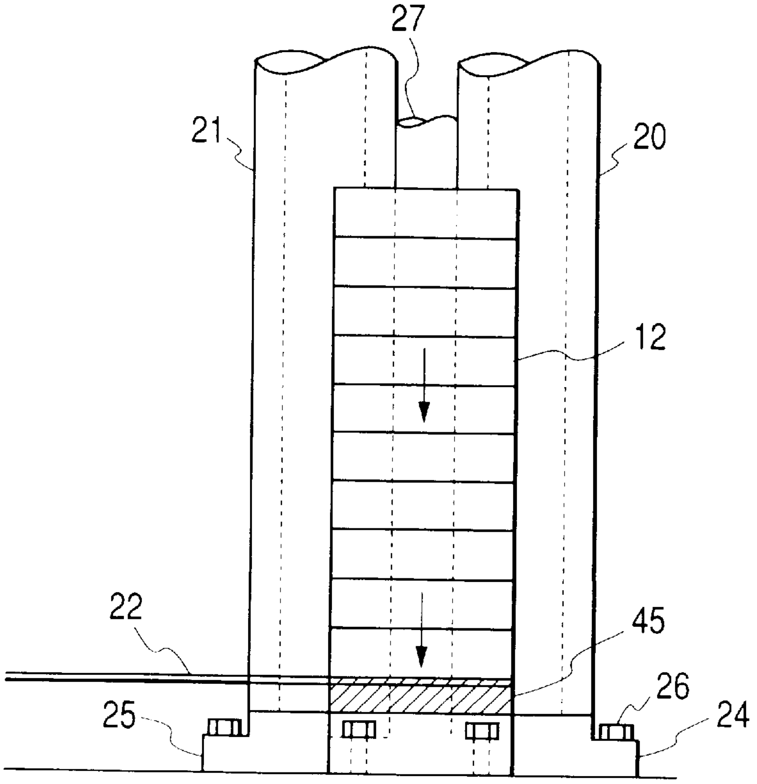
FIG. 4 is an enlarged longitudinal sectional view of the zinc oxide element unit included in the tank-type surge arrester of FIG. 1.
Figure 5:
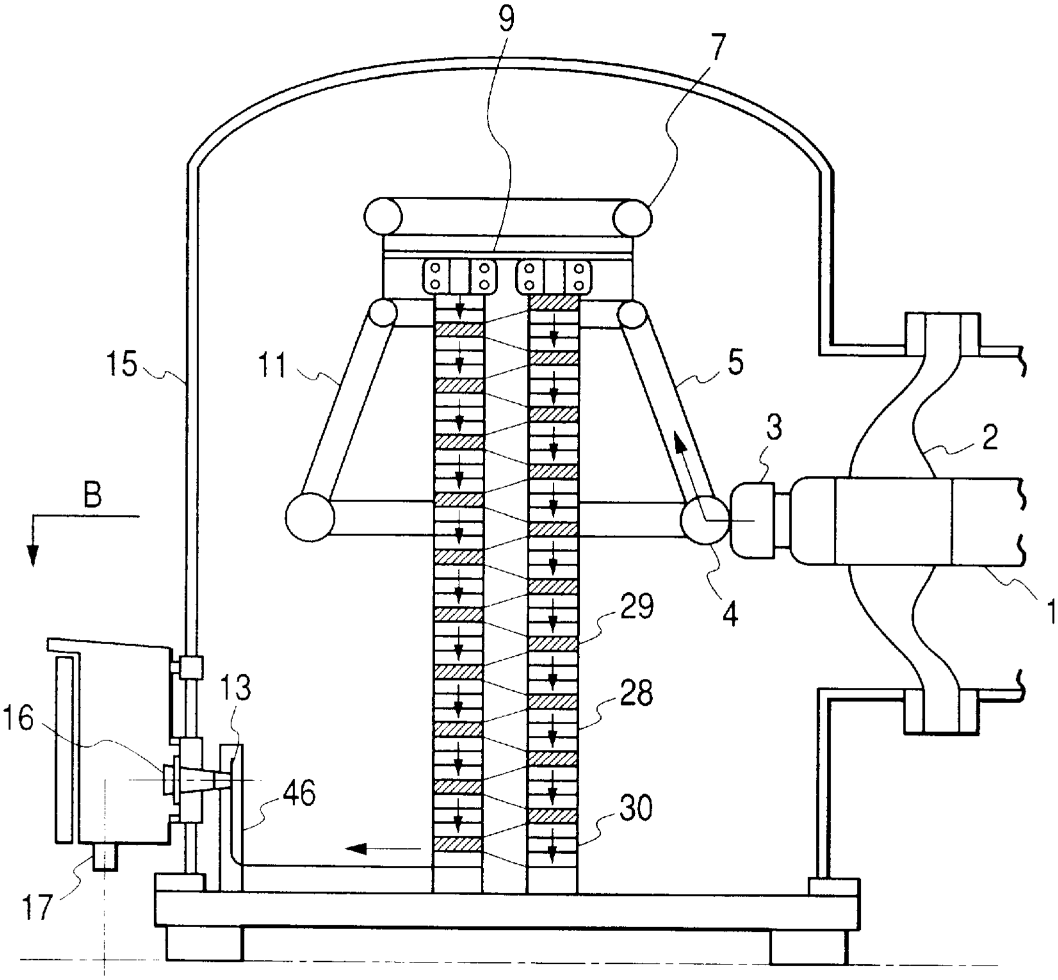
FIG. 5 is a longitudinal sectional view of a tank-type surge arrester in a second embodiment according to the present invention.
Figure 6:
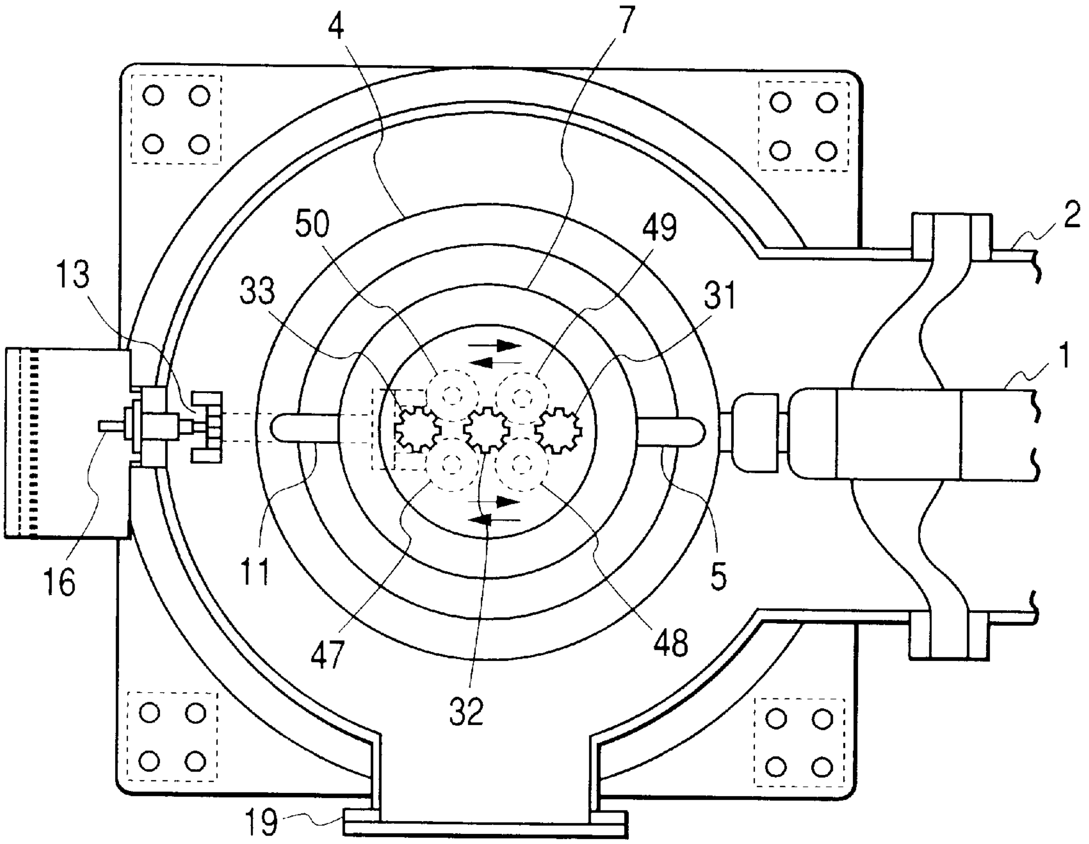
FIG. 6 is a sectional view taken on line B—B in FIG. 5.
Figure 7:
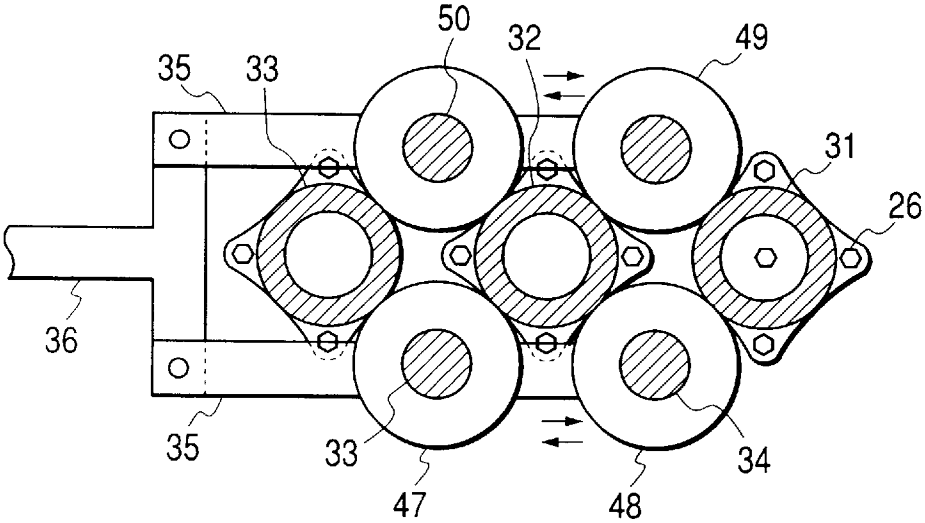
FIG. 7 is an enlarged cross-sectional view of a zinc oxide element unit included in the tank-type surge arrester of FIG. 5.
Figure 8:
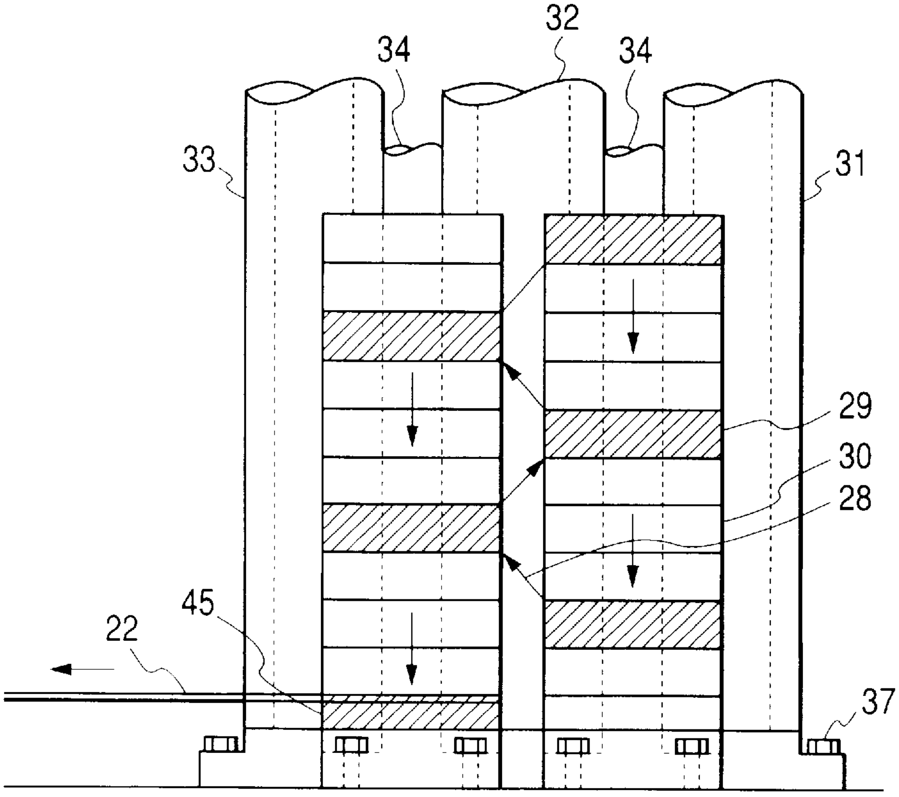
FIG. 8 is an enlarged longitudinal sectional view of the zinc oxide element unit included in the tank-type surge arrester of FIG. 5.

A tank-type surge arrester in a first embodiment according to the present invention will be described with reference to FIGS. 1 to 4. Referring to FIG. 1, the tank-type surge arrester has a surge arrester unit installed in an $SF_6$- or oil-insulated tank 15. The surge arrester unit is provided with zinc oxide elements 12 fixedly set on an insulating plate 45 placed on a bottom plate 18 of the tank 15. The zinc oxide elements 12 have a reference voltage of 200 V/mm or above. As shown in FIGS. 2 to 4, the zinc oxide elements 12 are arranged side by side in two columns. Each zinc oxide element 12 is supported by an insulating rod 27. Since a problem arises in the ability of the zinc oxide element 12 to withstand earthquakes and the strength of the zinc oxide 12 to withstand external forces that may act thereon during transportation, insulating tubes 20 and 21 are disposed in contact with the zinc oxide elements 12 to construct a structure having a large section modulus and sufficient strength. Flanges 24 and 25 are attached to the lower ends of the insulating tubes 20 and 21 and the flanges 24 and 25 are fastened to the bottom plate 18 of the tank 15 with bolts 26. Flanges are attached to the lower end of the insulating rods 27 and the flanges are fastened to the bottom plate 18 of the tank 15 with bolts. Connecting conductors 22 are connected to the lower ends of the zinc oxide elements 12, and the connecting conductors 22 are joined to a connecting conductor 23. The connecting conductor 23 is fixed to the bottom plate 18 by a fixing member 46 insulated from the tank 15 by an insulating plate 13. The connecting conductor 23 is connected to a sealed terminal 16 connected to a grounding conductor 17. The grounding conductor 17 is disposed in a vertical plane on an extension of a high-tension bus 1. Therefore a cubicle 14 can be disposed on the side of the grounding conductor 17. Work for inspecting an alarm device that gives an alarm when the tank-type surge arrester operates, recorders and such contained in the cubicle is facilitated, work for the maintenance of the tank-type surge arrester is facilitated, and hence operating reliability is enhanced.

A connecting plate 9 is supported on the upper end, i.e., the head part, of the surge arrester unit comprising the zinc oxide elements 12, by a spring 10. The zinc oxide element 12 is provided with a conductor 8 between the bottom plate 18 of the tank 15 and the connecting plate 9 to short the spring 10. A field control shield ring (insulation control shield ring) 7 is disposed above and electrically connected to the connecting plate 9. The shield ring 7 is electrically connected to an upper shield ring 6 disposed below the connecting plate 9, and the upper shield ring 6 is electrically connected to a lower shield ring 4 by a tubular conductor 5. The lower shield ring 4 is connected to the $SF_6$- or oil-insulated high-tension bus 1 by a connecting conductor 3. The high-tension bus 1 is supported on an insulating spacer 2 so as to be isolated from the ground.

A high voltage is applied through the high-tension bus 1 to the tank-type surge arrester. The high-tension bus 1 is isolated from the ground by the insulating spacer 2, and a high voltage is applied to the surge arrester unit through the connecting conductor 3. The connecting conductor 3 is connected through the lower shield ring 4, the tubular conductor 5 and the upper shield ring 6 to the connecting plate 9. The connecting conductor 23 fixed to the fixing member 46 is connected through the sealed terminal 16 to the grounding conductor 17. A surge current produced in the high-tension bus 1 flows through the zinc oxide elements 12 to the ground.

As shown in FIG. 1, the surge arrester unit is a simple structure of the series-connected zinc oxide elements 12. It is an electrical problem in this tank-type surge arrester that the zinc oxide elements 12 are subject to the influence of stray capacitance C1 between the surge arrester unit and the tank 15, and voltage distribution to the zinc oxide elements 12 become irregular. A correcting stray capacitance C2 is produced between the zinc oxide elements 12 and the conductor 5 to correct irregular voltage distribution. The correcting stray capacitance C2 is produced by disposing the conductor 5 opposite to a conductor 11. Voltage distribution can be corrected by the correcting stray capacitance C2 to a voltage distribution ratio of 1.1 or below. If an excessive number of conductors 5 and 11 are employed, voltage distribution will be deteriorated by overcompensation.

Figure 9:
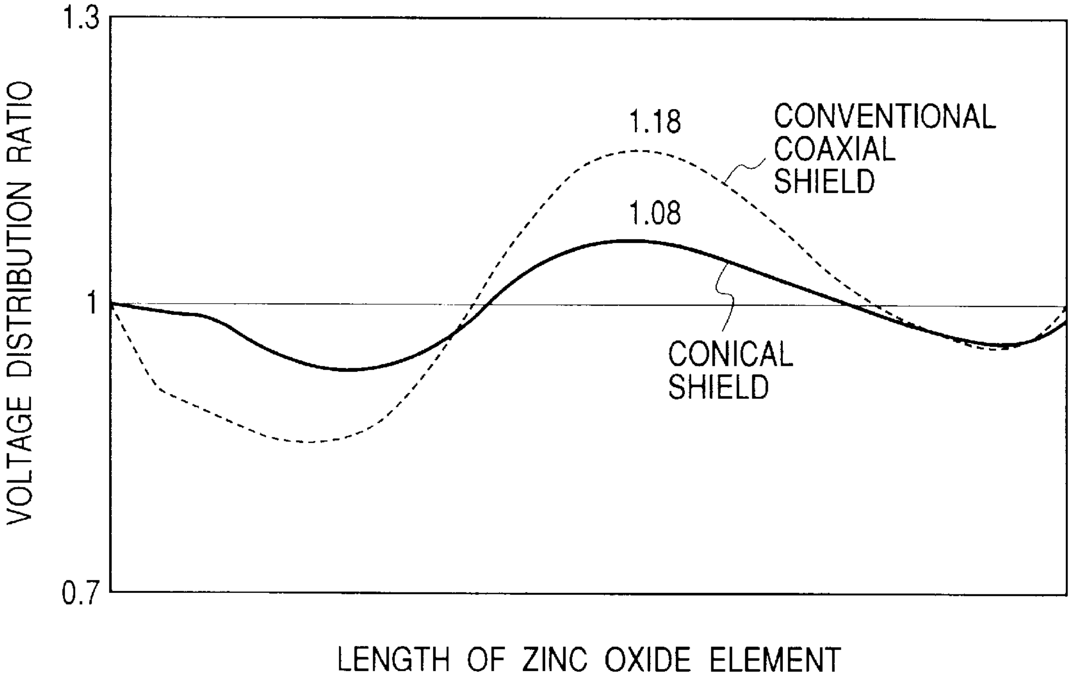
FIG. 9 is a graph showing voltage distribution on a zinc oxide element.

In this embodiment, the shield rings 4, 6 and 7 are disposed in an upper section of the surge arrester unit. The insulation control shield ring 7 is disposed on top of the surge arrester unit, the upper shield ring 6 is disposed at an upper position, the lower shield ring 4 is disposed at a lower position, and the tubular conductors 5 and 11 are extended between the upper shield ring 6 and the lower shield ring 4. The conductors 5 and 11 are included in a vertical plane including an extension of the high-tension bus 1. The stray capacitance C2 between the conductor 5 and the zinc oxide elements 12 is adjusted so that voltage is distributed to the zinc oxide elements 12 evenly as indicated by a continuous line in FIG. 9 to meet a voltage distribution ratio of 1.1. Since the tubular conductors 5 and 11 are included in a vertical plane including an extension of the high-tension bus 1, the tubular conductor 5 and the connecting conductor 3 can be arranged on a straight line. Therefore, the influence of a projection of the connecting conductor 3 on the disturbance of the electric field can be eliminated, and the adverse effect of the disturbance of the electric field on the distribution of voltage to the zinc oxide elements 12 can be suppressed. Since the tank-type surge arrester has a high mechanical strength, production of metal particles and the like due to the vibration of the shield rings can be suppressed.

The tank-type surge arrester requires an excellent protective characteristic in view of insulation cooperation. The 500 kV surge arrester normally has a discharge voltage of 870 kV/10 kA. To the contrary, when the zinc oxide elements 12 are parallely arranged in two columns, the 500 kV surge arrester has a discharge voltage of 850 kV/5 kA. Further, when the elements 12 are parallely arranged in three columns, it has a discharge voltage of 830 kV/3.3 kA.

Since the shape of the voltage distribution control shield ring and the method of connecting the shield ring to the zinc oxide elements are thus optimized, an appropriate voltage distribution at a voltage distribution ratio of 1.1 or below can be achieved even if the intrinsic capacitance of the zinc oxide elements is reduced due to an increase in the resistance of the zinc oxide elements.

Second Embodiment

A tank-type surge arrester in a second embodiment according to the present invention will be described with reference to FIGS. 5 to 8. The tank-type surge arrester in the second embodiment is of a rating, for example 800 kV, higher than that of the tank-type surge arrester in the first embodiment. A tank-type surge arrester of a high rating can be constructed in the construction shown in FIG. 1 by simply increasing the number of elements connected in series, which, however, requires to construct the tank-type surge arrester in a height which will not meet conditions for transportation by truck. In the tank-type surge arrester in the second embodiment, zinc oxide elements are arranged in a back-and-forth arrangement.

The tank-type surge arrester in the second embodiment is similar in construction to the tank-type surge arrester in the first embodiment shown in FIGS. 1 to 4. A zinc oxide element 30 consists of an insulating plate 29 and a connecting conductor 28. Current flows reciprocally between columns 47 and 48 of zinc oxide elements, and current flows reciprocally between columns 49 and 50 of zinc oxide elements. The zinc oxide elements are connected to connecting conductors 35 connected to a connecting conductor 36. The inductance of a structure constructed by arranging the zinc oxide elements 30 in a back-and-forth arrangement is lower than that of a conventional structure constructed by arranging zinc oxide elements in a zigzag arrangement. Insulating tubes 31, 32 and 33 are placed between the columns 47, 48, 49 and 50 to construct a surge arrester unit consisting of the zinc oxide elements in a large section modulus so that the surge arrester unit withstands external forces and vibrations that may be exerted thereon during transportation, and earthquakes.

Figure 10:
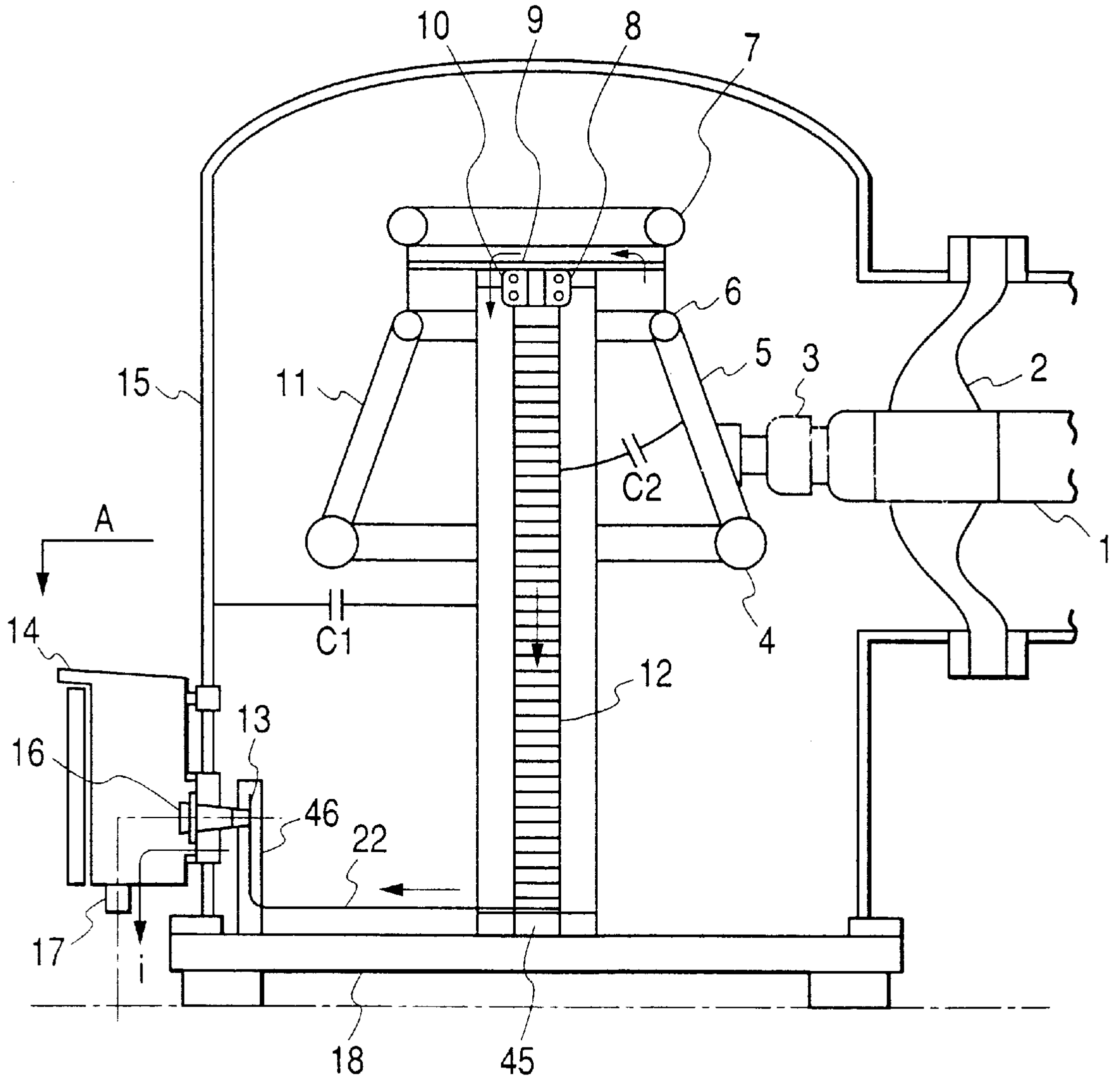
FIG. 10 PRIOR ART
FIG. 10 is a longitudinal sectional view of a tank-type surge arrester.

As shown in FIG. 10, a high-tension bus 1 may be directly connected to the conductor 5 for the same effects.

Although the invention has been described in its preferred embodiments with a certain degree of particularity, obviously many changes and variations are possible therein. It is therefore to be understood that the present invention may be practiced otherwise than as speciically described herein without departing from the scope and spirit thereof.

What is claimed is:

1. A tank-type surge arrester comprising: a zinc oxide element unit including zinc oxide elements; a top shield ring for earth insulation control disposed on a top side of the zinc oxide element unit; an upper shield ring disposed below the top shield ring in an upper section of the zinc oxide element unit; an expanded lower shield ring disposed below the upper shield ring in the upper section of the zinc oxide element unit; and tubular conductors disposed between the upper and the lower shield rings so as to be included in a vertical plane on an extension of a high-tension conductor; and wherein the high-tension conductor is connected by a connector to the lower shield ring.

2. The tank-type surge arrester according to claim 1, wherein the reference voltage of the zinc oxide elements is 200 V/mm or above.

3. A tank-type surge arrester comprising: a zinc oxide element unit including zinc oxide elements; a top shield ring for earth insulation control disposed on a top side of the zinc oxide element unit; an upper shield ring disposed below the top shield ring in an upper section of the zinc oxide element unit; an expanded lower shield ring disposed below the upper shield ring in the upper section of the zinc oxide element unit; and tubular conductors disposed between the upper and the lower shield rings so as to be included in a vertical plane on an extension of a high-tension conductor; and wherein the zinc oxide elements are parallely arranged in two columns, and two insulating tubes are disposed in contact with the zinc oxide elements.

4. The tank-type surge arrester according to claim 3, wherein the high-tension conductor is connected to one of the tubular conductors.

5. A tank-type surge arrester comprising: a zinc oxide element unit including zinc oxide elements: a top shield ring for earth insulation control disposed on a top side of the zinc oxide element unit; an upper shield ring disposed below the top shield ring in an upper section of the zinc oxide element unit; an expanded lower shield ring disposed below the upper shield ring in the upper section of the zinc oxide element unit; and tubular conductors disposed between the upper and the lower shield rings so as to be included in a vertical plane on an extension of a high-tension conductor; and wherein the zinc oxide elements are arranged in four columns, and the zinc oxide elements of the columns are arranged through insulators and connecting conductors in a back-and-forth arrangement.

6. A tank-type arrester comprising: a zinc oxide element unit including zinc oxide elements; a top shield ring for earth insulation control disposed on a top side of the zinc oxide element unit; an upper shield ring disposed below the top shield ring in an upper section of the zinc oxide element unit; an expanded lower shield ring disposed below the upper shield ring in the upper section of the zinc oxide element unit; and tubular conductors disposed between the upper and the lower shield rings so as to be included in a vertical plane on an extension of a high-tension conductor; and wherein the zinc oxide elements are arranged in four columns, and insulating tubes are disposed in contact with the columns of the zinc oxide elements.

7. A tank-type arrester comprising: a zinc oxide element unit including zinc oxide elements; a too shield ring for earth insulation control disposed on a top side of the zinc oxide element unit; an upper shield ring disposed below the top shield ring in an upper section of the zinc oxide element unit; an expanded lower shield ring disposed below the upper shield ring in the upper section of the zinc oxide element unit; and tubular conductors disposed between the upper and the lower shield rings so as to be included in a vertical plane on an extension of a high-tension conductor; and wherein a grounding conductor is disposed in a vertical plane on an extension of the high-tension conductor to ground a surge voltage generated in the high-tension conductor.

* * * * *